(12) United States Patent
Young

(10) Patent No.: US 7,185,726 B2
(45) Date of Patent: Mar. 6, 2007

(54) BICYCLE WITH OPTIONAL POWER ASSIST

(76) Inventor: Grant E. Young, 605 10th Ave., San Francisco, CA (US) 94118

( * ) Notice: Subject to any disclaimer, the term of this patent is extended or adjusted under 35 U.S.C. 154(b) by 0 days.

(21) Appl. No.: 10/863,072

(22) Filed: Jun. 8, 2004

(65) Prior Publication Data

US 2005/0016785 A1    Jan. 27, 2005

Related U.S. Application Data

(60) Provisional application No. 60/488,656, filed on Jul. 21, 2003.

(51) Int. Cl.
*B62M 23/02* (2006.01)
(52) U.S. Cl. ..................... 180/205; 180/220
(58) Field of Classification Search .......... 180/220
See application file for complete search history.

(56) References Cited

U.S. PATENT DOCUMENTS

| 1,158,311 A | 10/1915 | Schunk |
| 2,080,972 A | 5/1937 | Seehase |
| 2,586,082 A | 2/1952 | Platti |
| 3,841,428 A | 10/1974 | Blalek |
| 3,878,910 A | 4/1975 | Walker, Jr. |
| 3,905,442 A | 9/1975 | O'Neill |
| 3,912,039 A | 10/1975 | Ordamann |
| 3,915,250 A | 10/1975 | Laden et al. |
| 3,921,745 A | 11/1975 | McCulloch et al. |
| 3,966,007 A | 6/1976 | Havener et al. |
| 4,030,562 A | 6/1977 | Leighton et al. |
| 4,085,814 A | 4/1978 | Davidson et al. |
| 4,122,907 A | 10/1978 | Davidson et al. |
| 4,168,758 A | 9/1979 | Holt |
| 4,280,581 A | 7/1981 | Rudwick |
| 4,410,060 A | 10/1983 | Cunard |
| 4,516,647 A | 5/1985 | Novak |
| 4,541,500 A | 9/1985 | Gelhard |
| 4,637,274 A * | 1/1987 | Goldenfeld ................ 180/205 |
| 4,871,042 A | 10/1989 | Hsu et al. |
| 5,316,101 A | 5/1994 | Gannon |
| 5,433,284 A | 7/1995 | Chou |

(Continued)

FOREIGN PATENT DOCUMENTS

DE    3213043    10/1983

(Continued)

*Primary Examiner*—Kevin Hurley
(74) *Attorney, Agent, or Firm*—Thomas M. Freiburger

(57) ABSTRACT

A bicycle is fitted with rear panniers that provide electric motor assist and a power supply for the bicycle when desired. In a preferred embodiment the bicycle has a power coupling permanently attached at the rear wheel, for receiving an output drive shaft or power coupling from the motor pannier when that pannier is installed. The drive coupling may have gear reduction. To accommodate relative up and down motion between the pannier-supporting rack and the rear tire in a rear suspension bicycle, the motor drive unit in the motor pannier articulates, or the final drive unit on the bicycle can articulate, but this is more difficult because the rear suspension motion can be complex. Both panniers are secured by a quick connect device, for both mechanical attachment and electrical connection. The bicycle functions as a normal unpowered bike when the panniers are removed.

41 Claims, 16 Drawing Sheets

U.S. PATENT DOCUMENTS

| | | |
|---|---|---|
| 5,474,148 A | 12/1995 | Takata |
| 5,487,442 A | 1/1996 | Hua |
| 5,491,390 A | 2/1996 | McGreen |
| 5,778,998 A | 7/1998 | Shih |
| 5,816,355 A | 10/1998 | Battlogg et al. |
| 5,842,535 A | 12/1998 | Dennis |
| 5,853,062 A | 12/1998 | Hulett |
| 5,857,537 A | 1/1999 | Matsumoto et al. |
| 5,865,267 A | 2/1999 | Mayer et al. |
| 5,910,714 A | 6/1999 | Buchanan et al. |
| 6,011,366 A | 1/2000 | Murakami et al. |
| 6,039,137 A * | 3/2000 | Schless ............ 180/220 |
| 6,131,683 A | 10/2000 | Wada |
| D434,349 S | 11/2000 | Currie et al. |
| 6,155,369 A | 12/2000 | Whittaker |
| 6,290,014 B1 | 9/2001 | MacCready, Jr. |
| 6,516,911 B1 | 2/2003 | Mayer et al. |
| D473,495 S | 4/2003 | Niitsu et al. |
| 2001/0022246 A1* | 9/2001 | Dunbridge et al. ........ 180/65.8 |
| 2002/0027026 A1 | 3/2002 | Hong |
| 2004/0050603 A1* | 3/2004 | Jaeger ............ 180/181 |
| 2005/0067207 A1* | 3/2005 | Radtke et al. ............ 180/223 |

FOREIGN PATENT DOCUMENTS

| | | |
|---|---|---|
| GB | 2249529 | 5/1992 |
| GB | 2262490 | 6/1993 |
| JP | 09-175472 | 8/1997 |

* cited by examiner

BICYCLE WITH OPTIONAL POWER ASSIST

This application claims benefit of provisional application No. 60/488,656, filed Jul. 21, 2003.

BACKGROUND OF THE INVENTION

The bicycle is currently one of the most efficient means of human powered transportation in terms of converting human power into distance traveled. Modern bicycles require approximately 150 watts (0.2 HP) for consistent travel of approximately 15 MPH on level ground and less than 30 watts (0.04 HP) for travel at 5 MPH. This efficiency has been slowly improving throughout the history of the bicycle through engineering refinement; for example gearing, weight reduction, ergonomic/biometric alterations, and reduced mechanical and tire friction.

This invention relates generally to the field of bicycles and electric-assist powered bicycle. Bicycles being a very efficient form of human-powered two-wheeled transportation, and electric-assist bicycles being bicycles with supplemental force to accommodate the limitations of stamina and power inherent in a human-only powered bicycle system.

While bicycles have evolved to be a very efficient form of human-powered transportation, human power ultimately remains the primary restriction to increased utility of the bicycle as a general transportation device. There are two primary shortcomings in a human-powered system. First, human beings can typically generate only 100–200 watts of power for an extended time period (e.g., 15 minutes); the power output and length of time vary significantly from person to person. The second shortcoming is that humans have a limited amount of power they can produce; even the fittest persons can only generate approximately 500 w of burst energy.

The practical results of these performance limitations become obvious when looking at the power requirements for bicycling at higher speeds and/or traveling up grades. In order to travel on level ground at speeds of 20, 25, and 30 MPH, the power requirements in watts respectively are 260, 430, and 670. Obviously, constant travel at any speed greater than 20 MPH is impossible for all but the fittest of persons.

Similarly, the same human performance limitations affect travel on grades. At a constant 15 MPH, grades of 2, 5, and 10 percent result in power requirements of 275, 470, and 780 watts respectively. Even traveling up a grade of 10 percent at 5 MPH requires 240 watts; a grade of 20 percent results in a requirement of 450 watts.

Thus, regardless of the efficiency of modern bicycles, the utility of a bicycle is seriously limited by the stamina and power of the human operator and thus generally uncompetitive with motored forms of transportation in terms of speed and traveling distance. One solution to the limited utility of bicycles has been to add some type of power assistance to the standard bicycle. Numerous inventions have focused on a means by which to accomplish this, whether by electricity or other methods. Such systems add significant utility to the standard bicycle since the combined human and artificial power output increases range and total power output significantly; adding only ½ horsepower of continuous output to a bicycle has a significant impact on performance. For example, a ½ horsepower increase on a 5 percent grade results in a continuous speed increase from 5 MPH to nearly 18 MPH.

However, designing a practical electric propulsion system for a bicycle has proven to be a formidable task as evidenced by the absence of such electric powered vehicles currently available. Inventions related to motor assisted bicycles go back to the early 20th century (e.g., U.S. Pat. Nos. 1,158,311; 2,080,972, and 2,586,082) and typically added a cumbersome gas powered motor with a "friction drive" (i.e. a powered roller applying force directly to the tire of the bicycle).

There are also a number of more contemporary inventions that attach electrical components such as batteries, motor controllers and electric motors to a conventional bicycle (e.g., U.S. Pat. Nos. 3,841,428; 3,878,910; 3,905,442; 3,912,039; 3,921,745; 3,966,007; 4,516,647; 5,316,101; 5,491,390; 5,778,998; 5,857,537; 5,865,267; 5,910,714; 6,011,366; 6,516,911; U.S. Published Pat. App. 2002/0027026; Japanese Pat. No. 09175472A). The majority of these inventions use simple but inefficient friction drives to provide power to one wheel of the bicycle. Additionally these inventions do not typically support quick removal of the propulsion system. Another patent discloses a friction based drive mechanism but claims to be easily detachable (U.S. Pat. No. 3,841,428); this design uses a lever extending to a point near the leg of the operator that allows the operator to both control the level of friction and control the output of the motor.

One invention avoids the use of a friction drive by connecting the motor and rear wheel via a drive shaft extending from an electric motor above the rear wheel to a final bevel drive attached to the rear axle (U.S. Pat. No. 5,487,442). A similar disclosure specifies one embodiment that uses a chain drive from a motor above the rear wheel to the rear wheel (German Pat. No. DE3213043). Still other systems use a standard bicycle frame with battery placed at some point in the forward triangle and an exposed motor driving either the rear hub, primary drive chain, or crank (U.S. Pat. Nos. 3,915,250; 4,085,814; 4,122,907; 4,871,042; 5,433,284)

Still other related inventions have chosen to add electric propulsion to a non-standard bicycle frame and/or use significant non-standard bicycle componentry (U.S. Pat. Nos. 4,030,562; 4,168,758; 4,280,581; 4,410,060; 4,541,500; 5,474,148; 5,853,062; 6,131,683; 6,155,369; D473,495S) or house the electric propulsion system in a completely auxiliary fashion (e.g., U.S. Pat. No. 6,290,014). Two British patents/applications also disclose non-friction drive systems.

The first (UK Pat. No. GB2249529) uses a small electric motor driving the primary crank, while the battery is located on the left-hand side of the bicycle at the rear. The second (UK Pat. Publication No. GB2262490) uses a battery and motor module attached to the rear triangle of the bicycle frame at about the level of the top of the rear wheel. The battery alone is stated as easily detachable, and is very small, with very little battery capacity. The entire unit is "permanently affixed to the body except for repair purposes". A similar device (U.S. Pat. No. 6,290,014) uses a motor integrated with the crank and places the batteries in a rack over the rear wheel. Such devices are not easily and conveniently removed from the bicycle, place the weight of the unit too high on the bicycle, and do not adapt to full-suspension bicycles.

Two previous disclosures embody the general concept and layout of the current invention (U.S. Pat. Nos. 5,816,355 and 5,842,535) in that they both house electric propulsion system components in enclosures. However, both of these inventions rely on an inefficient friction drive wheel contacting the rear wheel of the bicycle, result in a relatively high center of gravity due to the location of weight on the bicycle frame, fail to make provisions for operation with a rear suspension bicycle, and do not provide additional storage. Further, each inconveniently requires manual disengagement of the drive wheel in order to reduce motor drag when power assist is not required.

It is the objective of the present invention to provide an improved electric-assist bicycle system that overcomes or greatly reduces the inherent compromises of existing designs. This invention embodies the advantages of current inventions (e.g., improved power and endurance, human and motor working parallel power), while circumventing common disadvantages. Improvements in the present invention include a system in which the integrity and efficiency of the stand-alone bicycle, with all its evolutionary improvements, is maintained. For example, the bicycle of this invention includes complete gear sets for efficiency and conventional construction and components, and is lightweight and has a normal outward appearance. Yet it is also the objective of this invention to provide an electric-assist method that provides clear advantages over other stand-alone bicycles and other electric-assist bicycles. The present invention provides sophisticated and efficient drive system embodiments afforded by a linkage from the motor to the rear wheel; not to the tire as with "friction drive" systems with their inherent transfer inefficiency, moisture intolerance, and issues with limited tire selection and increased tire wear. This invention also supports sufficient storage capacity to carry an energy supply consistent with the rider's needs. Further, this invention uniquely has a drive system that is compatible with suspended rear wheel motion, yet maintains suspension efficiency by placing the motor in a suspended element of the bicycle, while placing the weight of the motor drive system at a low level. It is also the objective of this invention that the complete system is transformed from an efficient and normal appearing stand-alone bicycle to a capable electric-assist vehicle in less than one minute and without tools. Further, these critical components are packaged in a way that maintains pleasing aesthetics, provides a safe enclosure for vulnerable electric components, is easily transportable, and adds additional utility to an electric assist bicycle system above that afforded by prior inventions.

SUMMARY OF THE INVENTION

The present invention is a bicycle/electric-assist bicycle system that is designed to minimize engineering compromises both in the stand-alone bicycle itself and in the electric-assist system. The present invention accomplishes this by providing an optimized electric-assist system which attaches simply and quickly to an uncompromised human powered bicycle, with a non-friction wheel drive. The operator has the option of quickly attaching the electric-assist components, housed in pannier-like enclosures, to the bicycle for powerful and efficient electric assist, or the operator can use the bicycle, with all its normal efficiencies, as a stand-alone human-only powered bicycle. Importantly, even with electric-assist panniers attached, the stand-alone bicycle drive train and other systems are unaffected, making non-motored usage perfectly feasible with the exception of the added weight (which can be quickly removed when desired).

The present invention houses the electric-assist drive components in pannier-style, preferably rigid housings that easily and quickly attach to and detach from the bicycle; the only electric-assist components not in the pannier enclosure are the motor throttle, minimal controls and instrumentation for the electric-assist system, a discrete coupling to the in-enclosure electric motor, and requisite wiring. Each pannier-like enclosure contains specific electric-assist components, the left enclosure preferably containing the electric motor, motor controller, and motor output assembly; the right pannier preferably containing the energy supply (ordinarily, but not necessarily, a rechargeable battery).

The design of the left (motor) pannier preferably includes an electric drive motor and motor controller, and, depending on embodiment, a flexible gear reduction chain drive or telescopic shaft drive, and a mechanical coupling for interfacing with the rear axle, drive assembly, or wheel rim ring gear depending on embodiment. Each of these designs has the advantage of permitting the efficient transfer of power from a stationary in-pannier electric motor to an articulating rear wheel of a full suspension bicycle. These systems are also compatible with non-suspended bicycles. A motor controller may also be housed in the motor pannier, the purpose of which is to control the motor current as a result of input from the throttle and/or other motor related circuitry. The motor pannier attaches to the rear utility rack with a latching mechanism that secures the pannier to the rack and secures the motor output drive mechanism to its corresponding bicycle based drive system coupling. Securing the pannier to the bicycle also completes the electrical connection between pannier and bicycle. The motor and motor controller preferably use approximately ⅓ or ½ of the total capacity of the pannier enclosure, leaving the remaining enclosed area for usable storage.

The power from the electric motor may reach the rear wheel of the bicycle by numerous methods, five possible embodiments of which are presented herein. All embodiments presented fulfill the requirements of efficient transfer (none is less than 94% efficient) regardless of environmental conditions, have a "suspended" motor and drive unit (in a pannier-like enclosure) that can drive the wheel of a rear suspended bicycle, have provisions for extremely quick attachment and detachment, and preferably provide additional storage capacity.

All of the embodiments involve non-friction wheel drive, meaning the wheel is driven not by a rotary member that contacts the tire or rim in a frictional engagement, as in much of the prior art. "Non-friction" does not mean without any friction in the rotating drive components.

In the first embodiment of this invention, the hub of the rear wheel is preferably driven directly by a gear reduction chain drive mechanism (herein called the motor drive unit) and motor located in the pannier. While not the only means to transfer power from the motor to the rear axle, the motor drive unit in this embodiment consists of two connected chain or belt drives that share an axle at the center connection point. This power transfer mechanism provides ample freedom of motion for the bi-axial rear suspension movement of some full suspension bikes, and also permits two separate gear or sprocket sets for requisite gear reduction. This device also facilitates an over-run clutch/freewheel on any of its three axles. The detachable power coupling (herein called a "power coupling") is located directly on the rear axle of the bicycle in this particular embodiment. In the preferred embodiments using this method, the power coupling may be as simple as a single mating shaft which is axially mounted to the drive unit or on-bicycle drive system, with a "receiving" component at its corresponding connection point. The mating shaft has features that enable the rotational transfer of power such as slots, one or more flat sides, or spline or hex features while the receiving mechanism has a mating tube with splines or other features on its inner diameter which mate with the external slots, splines, etc. on the mating shaft. The mating shaft also has retention features that, in conjunction with the parts of the transmission mating mechanism, prevent unwanted disconnection (e.g. spring ball and detent). Transfer efficiency for the first embodiment is approximately 98%.

The second embodiment of this invention relies on essentially the same pannier enclosed drive unit and motor as in the first embodiment, but instead transmits the power via a retaining mechanism clasped to a large "ring" gear attached to (or integral with) the rear wheel rim, serving as the non-friction wheel drive member. This retaining mechanism ensures proper alignment between pannier based drive gear and rim-based wheel gear and also resists drive or external forces to prevent separation of these gears during use. The attachment process occurs as the retaining mechanism is pushed into position on the ring gear, the follower moves out of the way (a spring causes the follower to forcibly contact the outer diameter of the ring gear) to allow the retaining mechanism to continue at which point a grove or ridge is detected and the roller snaps into place on the retaining feature of the ring gear. Transfer efficiency is approximately 96% in this embodiment.

The third and forth embodiments of this invention rely on basically the same pannier enclosed drive unit, motor, and power coupling as in the first embodiment. However, in these embodiments the power is transferred to the rear axle via either a sealed straight cut gear-to-gear drive mechanism (embodiment 3) or an enclosed gear set connected via chain (embodiment 4), comprising final drive units on the bicycle. In both of these embodiments, the on-bicycle power transmission mechanism relies on a bracket attached to the rear triangle of the bicycle to keep the connection spline (power coupling) at a constant location relative to the rear triangle. Transfer efficiency is approximately 95% and 96% respectively for these two embodiments.

The fifth embodiment relies on a pivot-mounted motor placed in the pannier connected to a telescoping drive shaft. In this embodiment, the power coupling seats into a sealed bevel final drive unit that houses the power coupling receiving mechanism. This sealed final drive rotates a limited degree around the rear axle to compensate for the telescoping shaft orientation during suspension articulation, and preferably is held in the correct position by a spring device when the pannier is not attached. Transfer efficiency is approximately 94% for the fifth embodiment.

The right side pannier-like enclosure (energy or power supply pannier) contains the energy source, usually a rechargeable battery but not excluding other technologies such as fuel cell or miniature generator. In the rechargeable battery based energy pannier, the rechargeable battery is designed such that it can be easily removed from the energy pannier for recharging or replacement. Additionally, it can be replaced with batteries of different sizes depending on the needs of the operator. Similar to the motor pannier, approximately ⅔ of the enclosed space (or at least ½ of the space) preferably is available for storage (depending on battery size). The energy pannier may also have a receptacle for the power cord from the battery charger.

Both panniers preferably are of a rigid construction to protect the electric-assist components and personal items stored in the remaining area of the panniers. The term pannier as used herein is intended to mean a substantially hard-shell enclosure, or an enclosure with a rigid frame, even if a flexible material covers or is supported by that frame. Each pannier possesses a handle on the top to facilitate easy handling of the pannier during attachment and detachment, and to facilitate carrying the panniers when not attached to the bicycle. Each pannier preferably also has a lockable lid for easy access to the storage area and, in the case of the energy pannier, easy removal of the rechargeable battery pack. Importantly, both motor and battery panniers preferably have electrical connections that are built into the mounting system so that the attach/detach process requires no (or minimal) additional electrical connections.

The panniers easily attach to a purpose built rear utility rack that is affixed to the bicycle. Attachment of pannier to bicycle requires attaching the top of the pannier first with the bottom of the pannier rotated slightly outward, and then upon seating the top of the pannier to the utility rack, the bottom of the pannier is pressed inward until in the self-latching male/female hex or spline connection seats to its counterpart (no such spline connection is required for the battery pannier). The pannier is then locked in place via a latch at the forward mounting point of the panniers. This latching mechanism insures that the panniers are secured to the utility rack and that additional force is applied to the power coupling to insure reliable constant connection. The cantilevered utility rack is integrated into the frame of the bicycle and acts as a typical rear utility rack both in functionality and appearance when panniers are and are not attached. The utility rack also contains the requisite wiring that connects the motor and energy panniers, and also routes the throttle and control wiring to the panniers.

Importantly, the cantilevered utility rack to which the panniers mount is attached to a suspended component of the bicycle (assuming a full suspension bicycle). This component of the invention, along with the preferred embodiments interfacing electric motor and rear bicycle wheel, affords a design in which the motor, battery and other electrical components reside on a suspended part of the bicycle (when used on a full suspension bicycle). The advantages of this are two-fold. First, the electric-drive components experience considerably less shock from road aberrations, thus improving the reliability and longevity of these components. Second, this design only minimally increases the unsprung (non-suspended) weight of the rear wheel thereby having little or no negative impact on the efficiency of the rear suspension.

The bicycle itself is a standard full suspension or non rear-suspended bicycle, the only alterations being the purpose built utility rack, the rear hub assembly and/or motor output shaft power coupling (depending on embodiment), a throttle, and minimal electric system control (e.g., on/off) and instrumentation (e.g., charge remaining). When panniers are not attached, the bicycle, by all outward appearance, is essentially completely conventional.

Although the described embodiments have the panniers and motor on the rear wheel of the bicycle, the invention also encompasses driving the front wheel, with a rack over the front wheel and panniers secured to that rack.

It is therefore among the objects of the invention to provide a reliable conveniently-used motor-driven bicycle wherein drive and power supply components are quickly and easily attached and detached, allowing use as a normal bicycle when desired. These and other objects, advantages and features of the invention will be apparent from the following description of a preferred embodiment, considered along with the accompanying drawings.

DETAILED DESCRIPTION OF PREFERRED EMBODIMENTS

Figure 1:
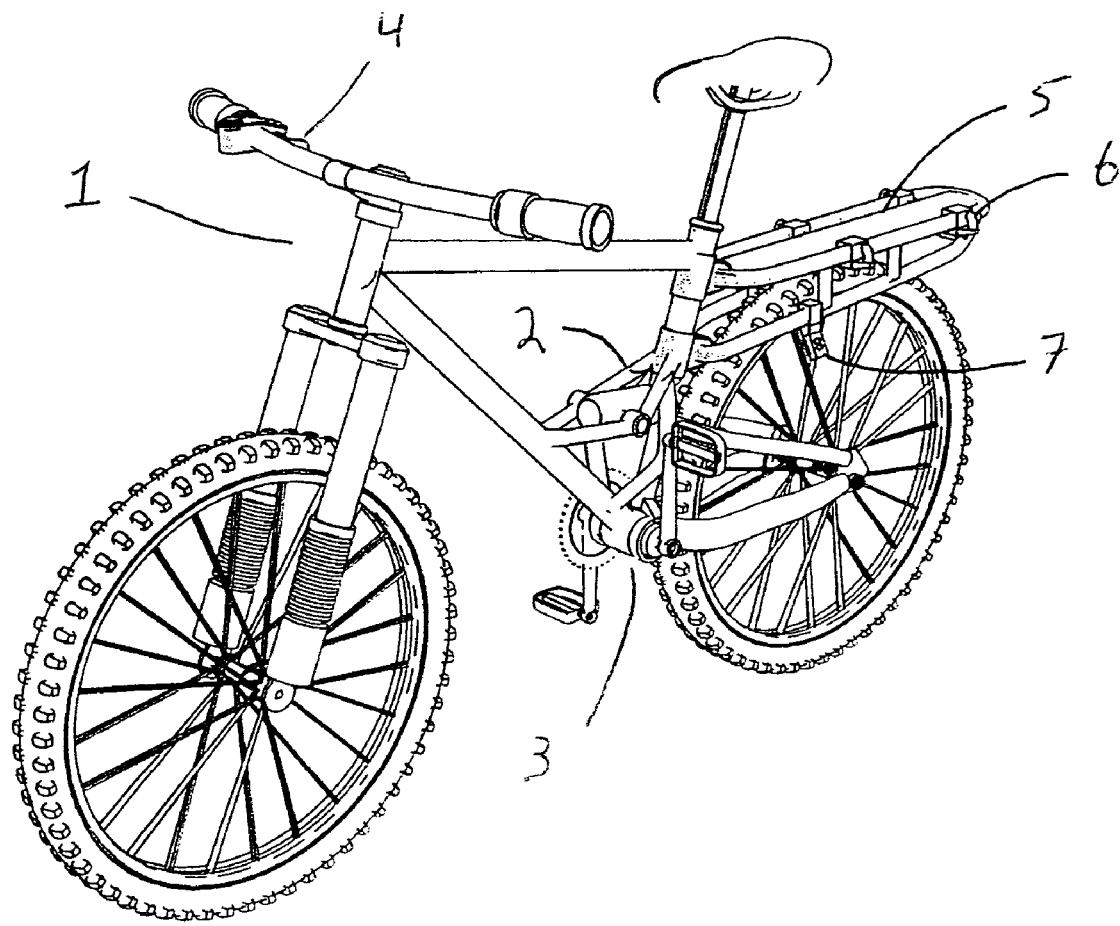
FIG. 1 is a perspective view of the stand-alone bicycle component of the electric-assist bicycle system, as the system appears without the pannier-like power system enclosures attached. Drive system embodiments are not shown in this figure.

FIG. 1 depicts a representative stand-alone bicycle 1 with rear suspension 2 and other standard components 3, including pedals, sprockets, chain, etc. The present invention also includes several non-standard components required to operate the electric-assist system when attached; for example a throttle and electric system switch cluster 4 and rear utility rack 5 that acts as a mounting platform and electrical bus for the electrical component enclosures. FIG. 1 also depicts requisite elements of the utility rack 5 with top attachment points 6 and combined forward attachment point/electrical connections with latching mechanism 7. Also apparent is the fact that the cantilevered utility rack 5 (and thus attached electric-assist enclosures) is a suspended, "sprung" component of the bicycle as opposed to the rear wheel and swing arm which are considered "unsprung" weight. Thus, the rear wheel moves up and down relative to the utility rack (and pannier-like enclosures, if attached) as the rear suspension performs its function. This relative motion can be several inches.

Figure 2:
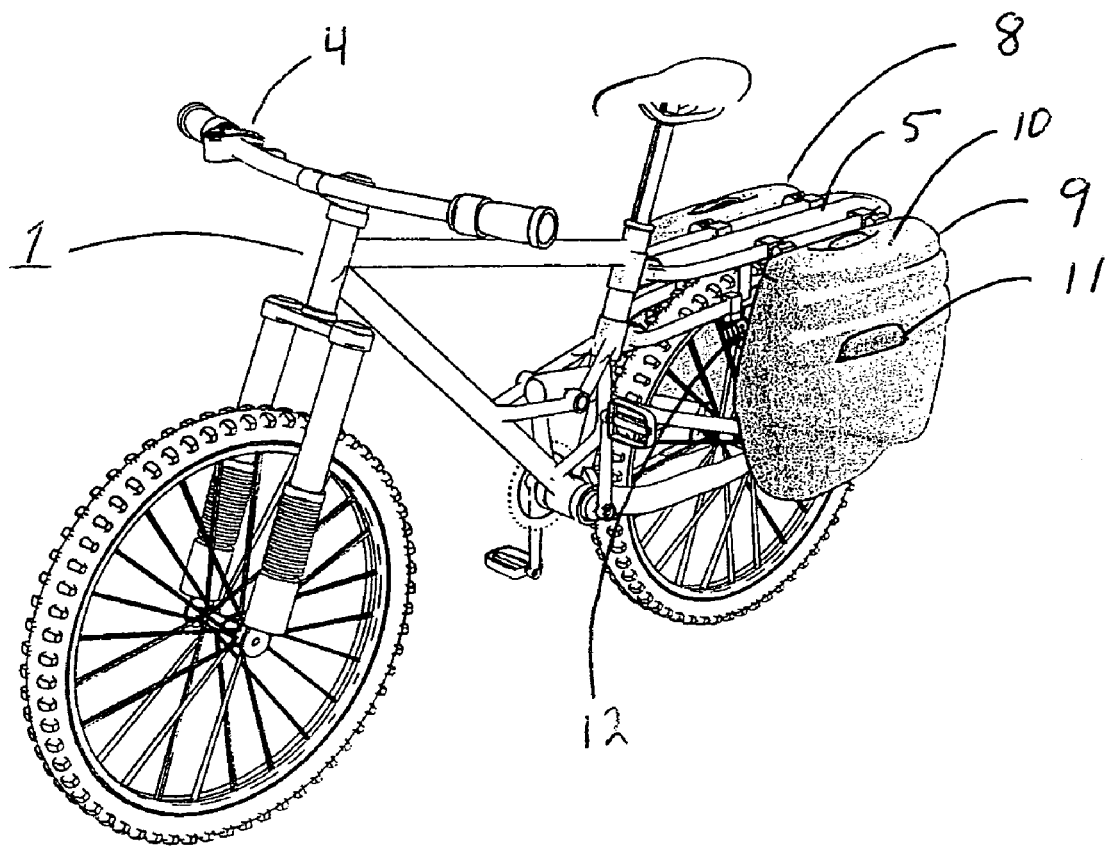
FIG. 2 is a perspective view of the bicycle system with the pannier-like power system enclosures attached. This is the appearance of the bicycle system when electric-assist is desired.

FIG. 2 depicts the same stand-alone bicycle 1 but with pannier-like electric-assist enclosures (referred to herein as panniers) attached to the bicycle thus completing the electric assist system; specifically an energy source pannier 8 and motor pannier 9. Visible on the pannier 9 is a removable lid 10, handle 11 for lifting pannier, and forward attach point/latching mechanism/electrical connection 12 to secure the pannier to the bicycle.

Figure 3:
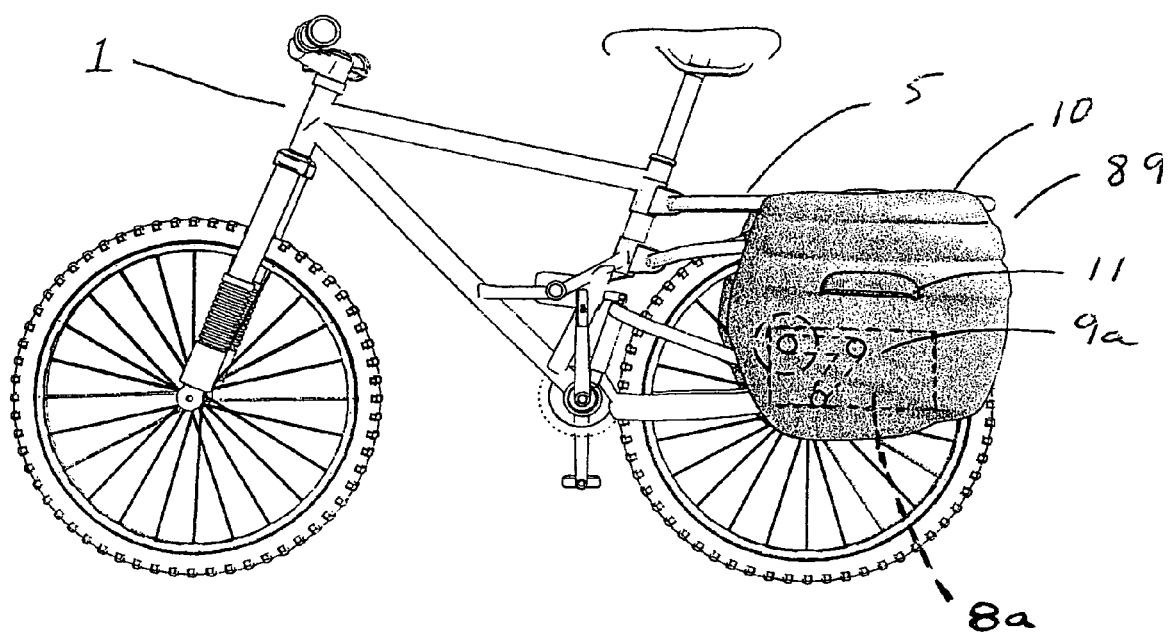
FIG. 3 is a side view of the bicycle system with the pannier-like power system enclosures attached.

FIG. 3 shows a side view of the complete invention, with bicycle 1 and battery/motor-containing panniers 8 and 9 attached to the utility rack 5. Also visible are representative locations for the motor and drive unit located in the pannier 9, indicated in dashed lines at 9a. It is to be understood that the arrangement of components in the pannier 9 is illustrative only as the components could be arranged in any convenient manner in the pannier so as to meet the objectives of driving the bicycle wheel and adequate storage space in the top portion of the pannier. This applies also to placement of items in the energy pannier 8. FIG. 3 indicates schematically and generally, in dashed lines, the battery 8a positioned in the energy pannier 8, on the opposite of the bicycle.

Figure 3A:
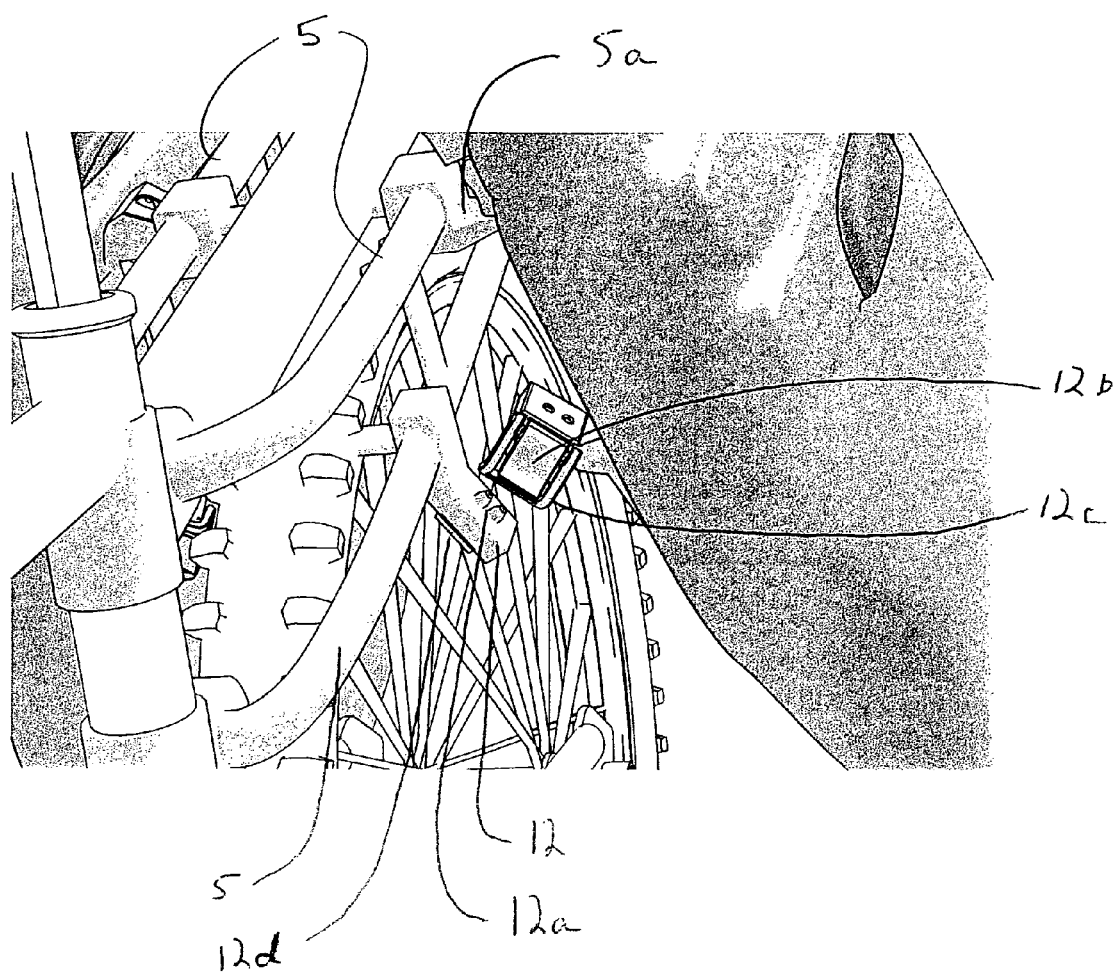
FIG. 3a is a perspective view of the forward connection point for pannier and utility rack, showing electrical connection and latching mechanism.

FIG. 3a shows a close-up perspective view of the of utility rack 5 with pannier attached at top points 5a but not yet connected at the forward electrical connection/attach point 12. Visible in this figure are the positive and negative electrical connectors 12a that also act as rigid securing devices that keep the pannier securely positioned when latched to the utility rack 8. The latch itself is also shown and operates via a lever 12b that is pushed down and away from the operator into place once the securing "arm" 12c of the latching mechanism is in place in its corresponding groove on the inner side of the utility rack forward attachment point 12d. Unlatching takes place by pulling the lever 12b toward the operator thereby releasing the securing arm 12c from behind the utility rack forward attach point 12d.

Figure 4:
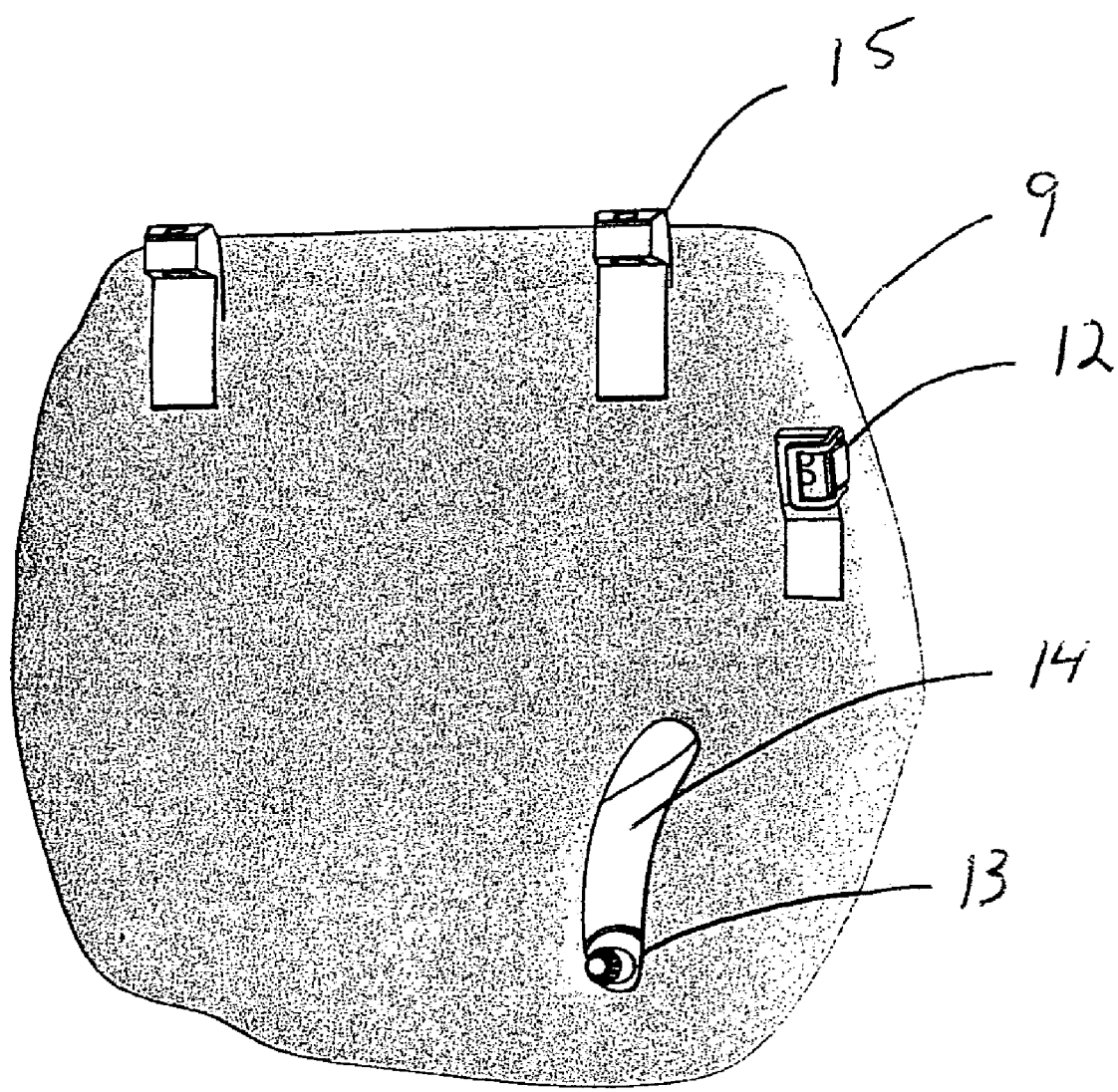
FIG. 4 is a perspective view of the inner side of the motor pannier with visible motor output shaft or power coupling element.

FIG. 4 shows the inner side of the motor pannier 9 with representative power coupling 13 of the drive unit (e.g., embodiments 1, 3, and 4) protruding from the pannier case. Also visible is a slot 14 in the pannier 9 in which a portion of the drive unit moves in accordance with suspension articulation. The slot is wide enough to allow for more complex motion with some rear suspensions. Also visible are representative latching "hooks" 15 on the top of the pannier and forward electrical connection/attach point 12 that interface with the utility rack 5. The term power coupling refers to the driving connection from the motor drive unit to the bicycle. In this case the power coupling includes a shaft protruding from the motor drive unit, or a splined female rotary component 13 can be part of the power coupling, with a shaft to be inserted therein when connection is made (such a shaft need not be permanently affixed to either motor drive unit or bicycle). The bicycle has a power coupling to mate with the pannier's power coupling when the pannier is put on the bike.

Figure 5:
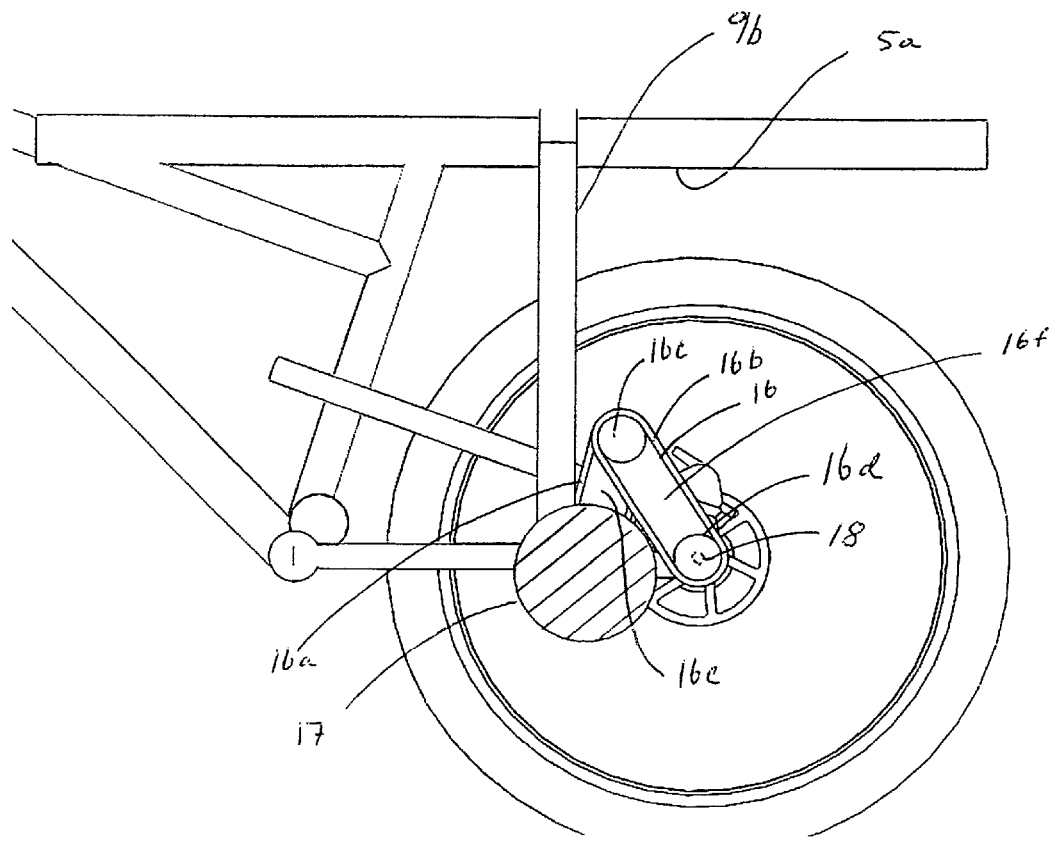
FIG. 5 is a schematic side view of a first embodiment of the invention in which the drive unit couples directly to the rear axle.

FIG. 5 shows the first embodiment of the invention in which the hub of the rear wheel is driven directly by the motor drive unit 16 and motor 17 (schematically indicated as a circle) located in the pannier. A vertical structural connection indicated at 9b merely represents the pannier 9 as attaching the motor 17 to the rear utility rack, represented as 5a. This figure is for illustrative purposes only as motor and motor drive unit would be enclosed in the pannier with the motor mounted solidly to the pannier with clearance for the drive unit 16 to articulate with the suspension. While not the only means to transfer power from the motor to the rear axle, the motor drive unit 16 in this embodiment consists of two chains or belts 16a, 16b that share an axle at the center connection point 16c but are connected to independent cogs or sprockets (16d visible adjacent bicycle hub) at the end of each extension arm 16e, 16f of the drive unit. This power transfer mechanism provides ample freedom of motion even for bi-axial rear suspension movement, and also permits two separate gear sets for requisite gear reduction. This device also facilitates an over-run clutch/freewheel at any of its three axles.

Because this device relies on chains or belts, and is protected from the elements since it is primarily enclosed in the pannier, it is mechanically efficient, quiet, and extremely durable. The power coupling is located directly on the axis of rotation of the wheel, i.e. the rear axle 18 (shown in dashed lines) and drives the rear wheel hub via an axle protruding through the left-hand framer "drop out" (not shown in this figure), that serves as the bicycle's power coupling.

In the preferred embodiments using this power coupling, the mechanism may be as simple as a single mating shaft which is axially mounted to the drive unit 16 extending from the pannier or to the on-bicycle drive system and a "receiving" component at the corresponding connection point. The mating shaft, which may be permanently attached to the motor drive unit, or the bicycle drive system, or neither, has features that enable the continuous rotational transfer of power such as slots, one or more flat sides, or hex or spline features while the receiving mechanism has a mating socket with splines or other features on its inner diameter which mate with the external slots, splines, etc. on the mating shaft. Importantly, the mating shaft and corresponding mating socket have retention features that prevent unwanted disconnection. In the preferred embodiments using this system, there is a circular groove that runs around the mating shaft toward the end that is closest to the base of the shaft. The corresponding mating tube incorporates a "ball-detent" system (specifically, a ball that is biased radially inward by a spring) that snaps into the retention groove when the mating tube or socket slides over the mating shaft. An additional method of accomplishing this retention feature is to use attracting magnets in the mating components. The ball and spring or magnets are chosen such that the mating shaft can be removed from the mating socket, but only when a predetermined axial force is applied to pull them apart. Further, this axial force is chosen to be greater than the axial forces that occur during normal use of the bicycle system. This power coupling system is also designed so that it provides tactile and audible feedback to the user so that the user can tell when he or she has properly attached the drive unit.

Figure 6:
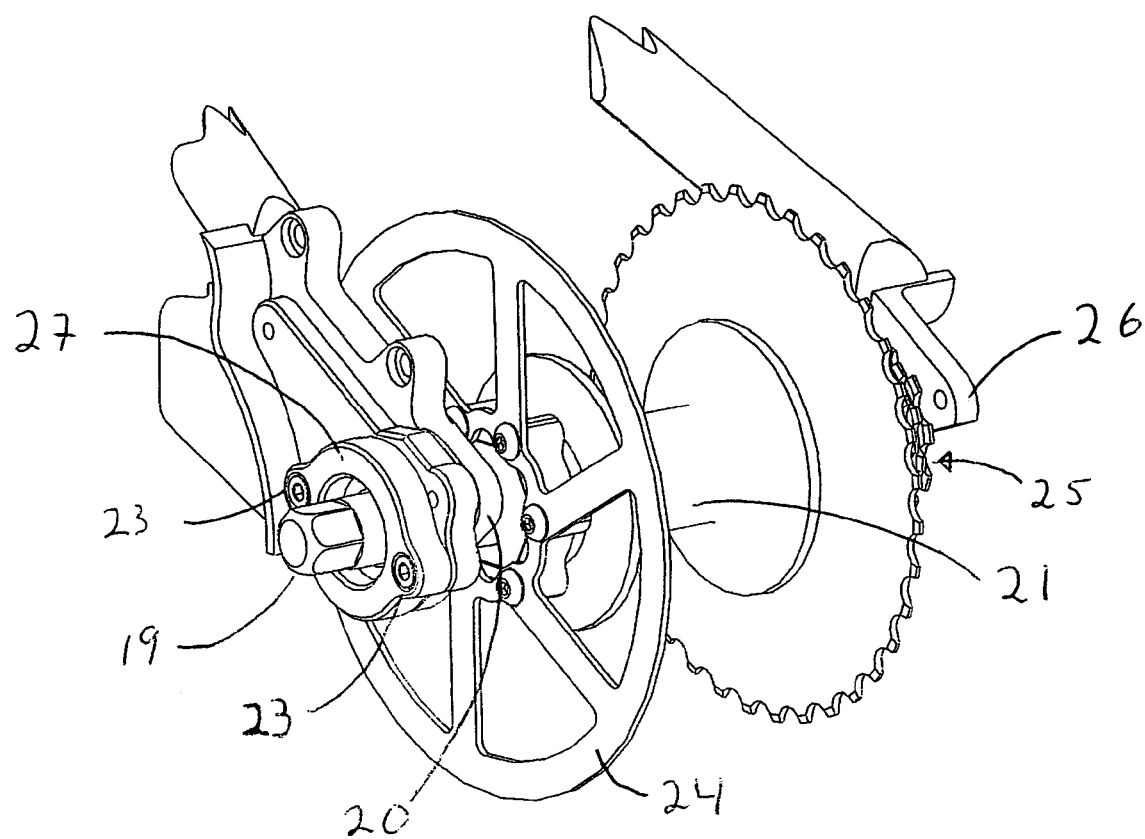
FIG. 6 is a close-up, schematic perspective view of the first embodiment of the invention.

FIG. 6 shows a close-up perspective view of one potential configuration of the drive mechanism described in the first embodiment of the invention. The power coupling element 19 on the bicycle is connected to an axle that passes through the heft-hand "drop-out" 20 (part of the bicycle frame) and connects into the rear wheel hub 21. Also visible is a clasping or bracket mechanism 27 that holds the axle securely within the axle guide and roller-bearing; retaining bolt(s) 23 for the mechanism 27 are also visible. This figure also shows a rear brake disk 24 (often included on high performance bikes), right-hand side multi gear gear-set 25, and unaffected right-hand side rear wheel "drop-out" 26. As in FIG. 6, the power coupling element 19 (the non-friction drive member in this embodiment) may be a male coupling member, but it could also be a female member, with a socket.

Figure 7:
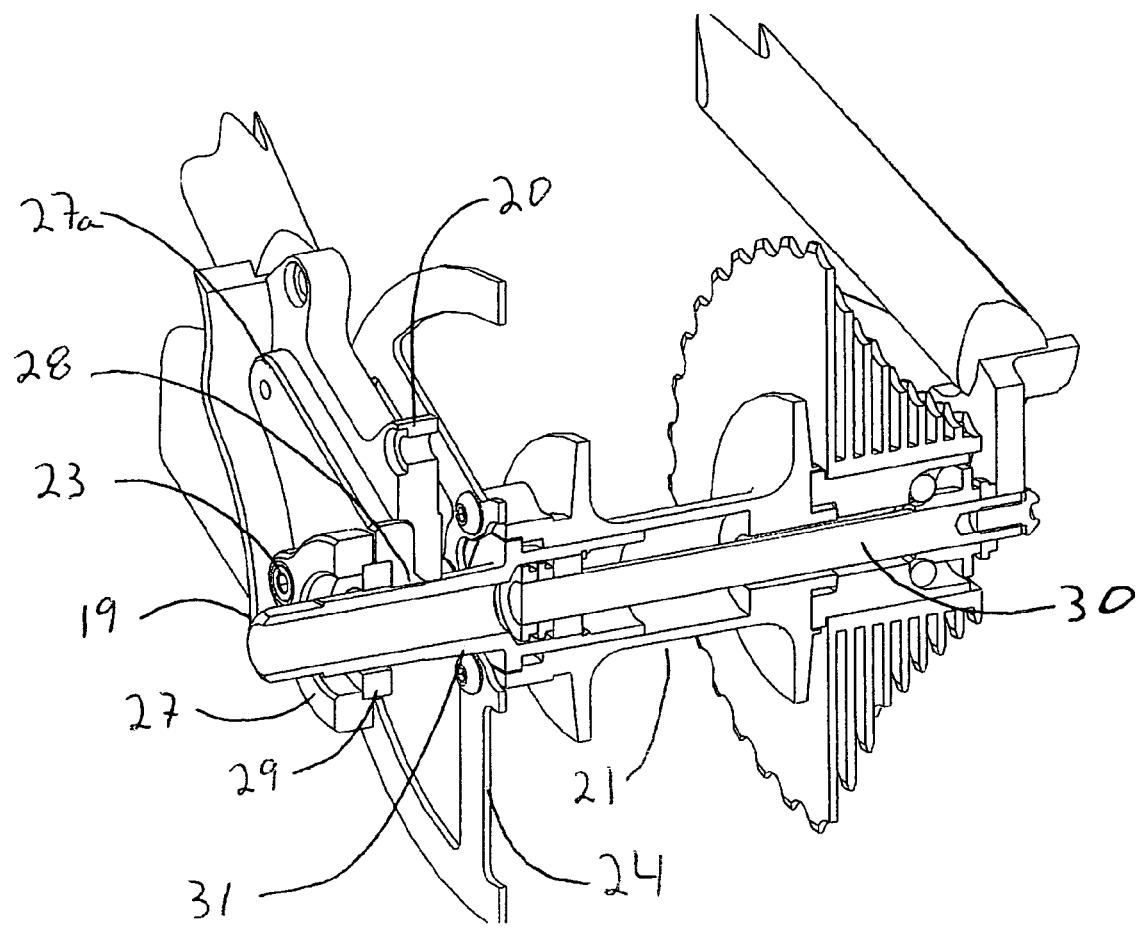
FIG. 7 is a close-up, schematic cut-away view of the first embodiment of the invention showing the internal mechanism permitting a coupling tipped axle to pass through the left-hand "drop-out."

FIG. 7 is a cut-away perspective view showing one potential configuration of the drive mechanism described in this first embodiment of the invention and shown in FIG. 6. Visible in this figure are the rear wheel hub 21, the power coupling element 19, clasping or bracket mechanism 27, retaining bolts 23, axle guide 28, clasping mechanism-supported axle bearings 29, right side axle 30 and left side axle 31. In this embodiment, power is transferred from the motor via the motor drive unit to the bicycle's power coupling element 19, transmitting power directly to the rear-wheel hub 21 via the axle 31 that passes through the left-hand "drop-out" 20 supported by bearing 29 and guide 28. The outermost, externally visible component 19 is a component of the left side axle 31 which in turn passes through the clasping mechanism and is held in place laterally in this embodiment via the inner diameter of the brake disk 24, which rotates along with the axle. The inner portion of the rear axle is designed such that it mates with an identically shaped indentation in the left side of the hub 21. It is to be understood that this is but one configuration for securing the axle 24 to the rear hub 21; in fact there are many means by which this basic connection could be accomplished. Additionally, the embodiment illuminated in this figure uses a mounting plate 27a that bolts to the rear triangle "drop out" and then serves and the piece to which the clasping mechanism 27 bolts. In fact, this mounting place 27a may not be required depending on the chosen method of manufacturing for this overall system. The illustrated mechanism is exemplary only; a number of other mechanisms could be used.

Figure 8:
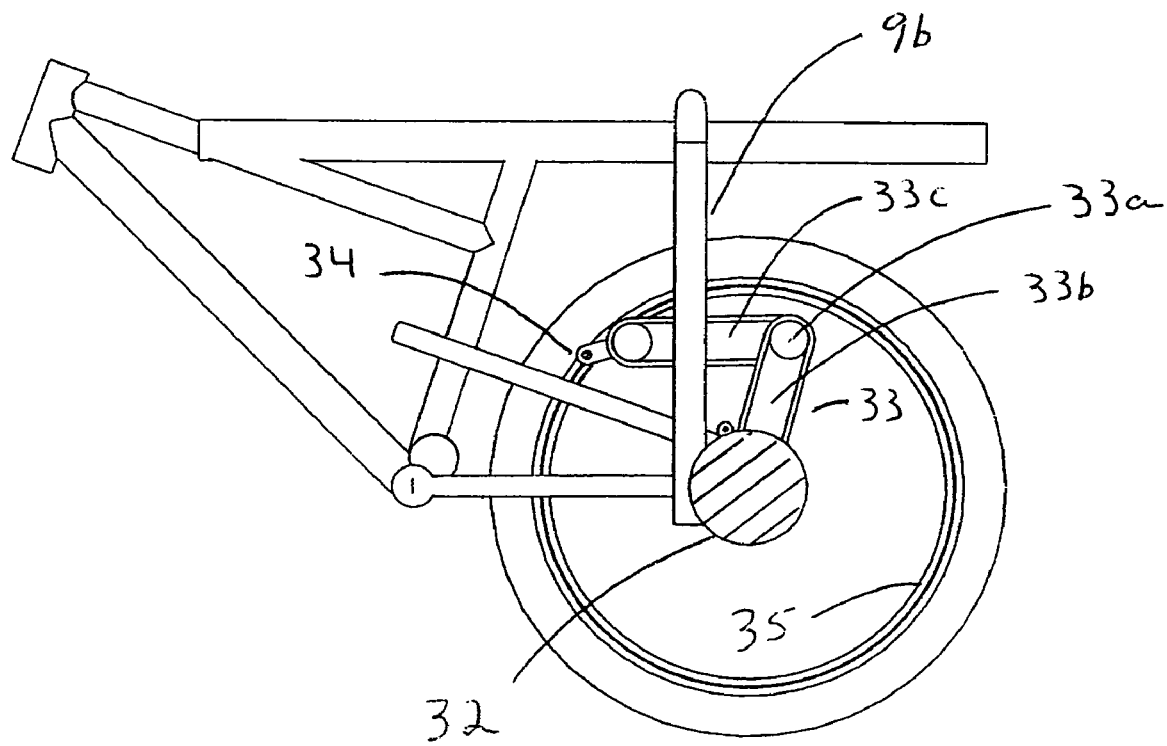
FIG. 8 is a schematic side view of a second embodiment of the invention in which the drive unit from the motor engages with a rear-wheel rim based ring gear.

FIG. 8 shows schematically one potential configuration of the second embodiment of the invention in which a pannier based motor 32 connected to a motor drive unit 33 transmits power via a retaining mechanism 34 clasped to a large "ring" gear 35 attached to the rear wheel rim. The motor 32 is represented as a circle, and a connection of the motor to the utility rack of the bike is represented by a vertical post 9b (as in FIG. 5). The motor drive unit 33 is articulated on two parallel axes, one at the motor, not seen, and another 33a at the junction of two articulated arms 33b and 33c, each with a drive chain as indicated.

Figure 9:
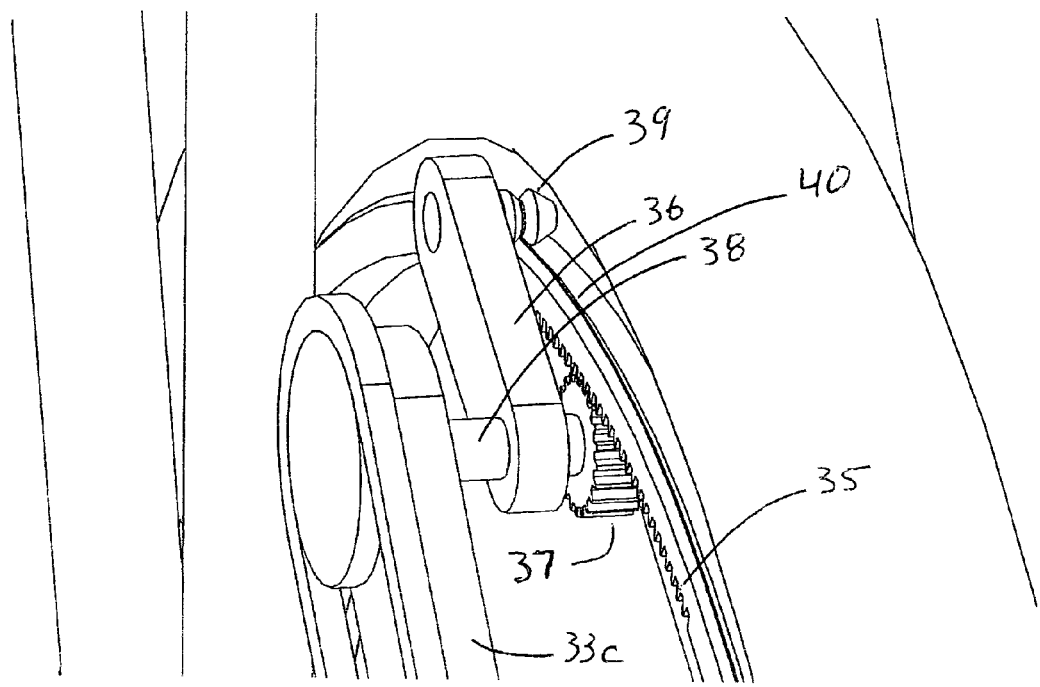
FIG. 9 is a close-up perspective view of the second embodiment of the invention showing a mechanism that clasps the rear-wheel rim based ring gear.

FIG. 9 shows a close-up view of the ring gear and retaining mechanism in one preferred configuration for this second embodiment of the invention. Specifically, the retaining mechanism 34 has an arm 36, bearing-mounted on a rotational shaft 38, to ensure proper alignment between the drive unit's drive gear 37 and the rim-based wheel gear or ring gear 35. The arm is spring tensioned to securely hold a ring gear follower 39 in place, guided by an alignment groove 40 on the external surface of the ring gear. This urges the driving gear 37 against the ring gear 35, retaining the driving engagement. Spring tensioning mechanisms could include a spring contained within or on a sleeve (not shown) surrounding the bearing-mounted rotational shaft 38, the sleeve being anchored on the arm 33c, or an exposed spring connecting the bottom of retaining mechanism arm 36 to the second articulating arm 33c of the drive unit. Note that the drive unit 33 preferably is contained inside the pannier with the drive shaft 38 extending out the inner side of the pannier.

The ring gear 35 can be mechanically retained to the wheel rim or to the wheel spokes, or it could be an integral part of a molded rim.

Figure 10:
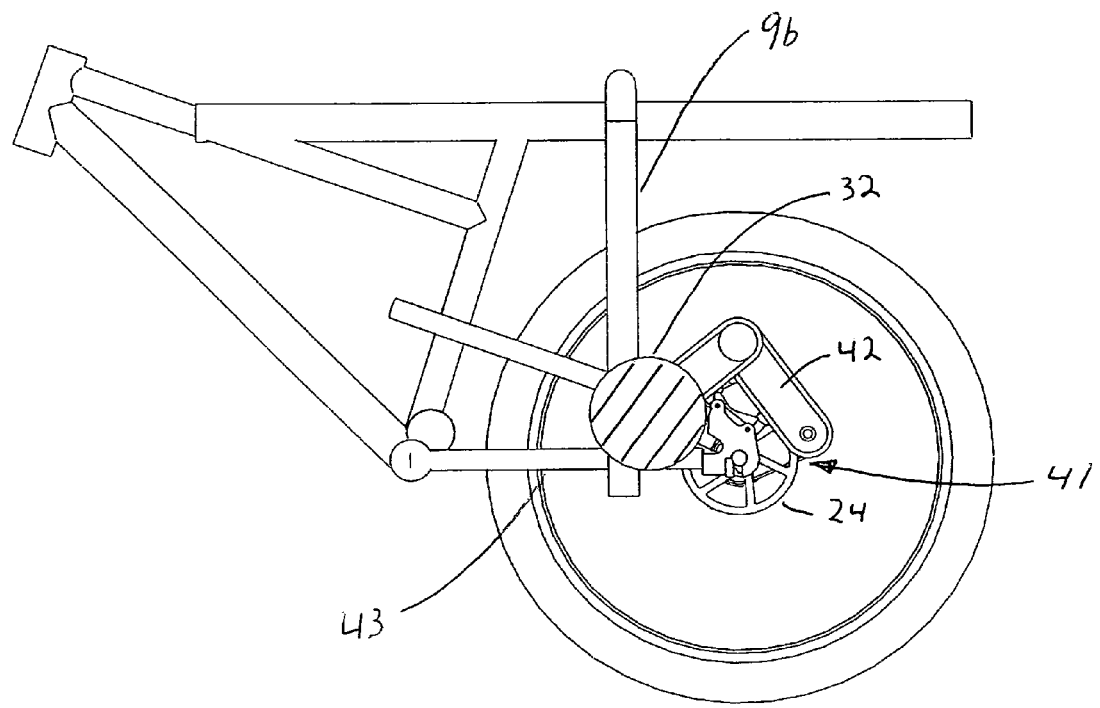
FIG. 10 is a schematic side view of third and fourth embodiments in which a sealed gear-to-gear or chain linked gear set final drive mechanism on the bicycle couples to a gear reduction chain drive in the motor drive unit.

FIG. 10 shows schematically a side view that depicts two possible configurations of third and fourth embodiments in which a sealed straight-cut gear-to-gear or chain linked gear set or belt drive final drive mechanism 41 on the bicycle couples to the pannier based motor drive unit 42 and motor 32. In this particular figure, the final drive mechanism 41 is located between the brake disk 24 and the wheel spokes (not shown), and the power coupling between motor drive unit and bicycle is thus located outside of diameter of the brake disk 24. Use of standard "V-brakes," or locating the final drive unit between the brake disk and the "drop-out", would allow a closer-in power coupling. Additionally, the final drive mechanism 41 is held in place against swinging rotation by a simple bracket (not shown) attached to the rear triangle 43 of the bicycle (also reaching around the brake disk if required) to keep the final drive mechanism's power coupling spline at a constant location relative to the rear triangle.

Figure 11:
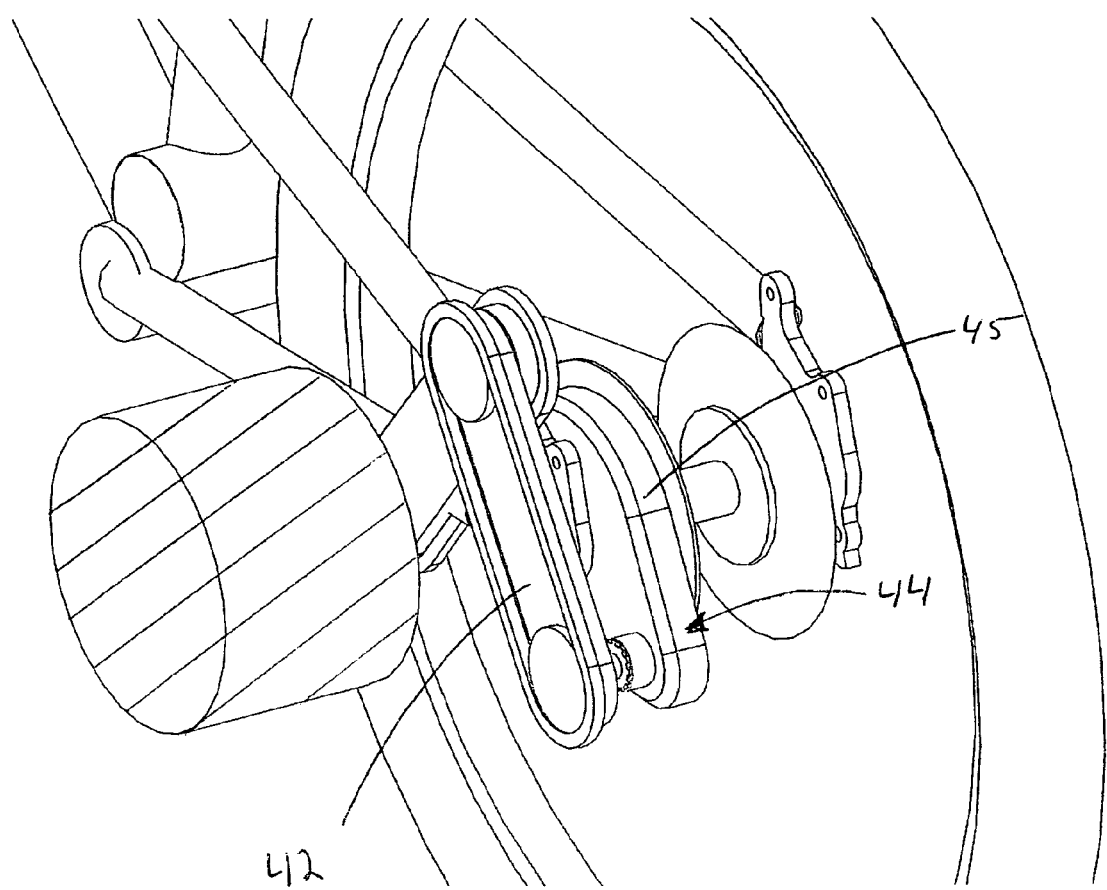
FIG. 11 is a perspective view of the third embodiment in which a gear-to-gear final drive on the bicycle couples to the pannier-based gear reduction chain drive.

FIG. 11 is a perspective view of one possible specific configuration of the third embodiment in which a sealed straight-cut gear-to-gear final drive 44 couples to the motor drive unit 42. The bicycle's final drive 44 has a sealed housing 45. No brake disk is shown in this view.

Figure 12:
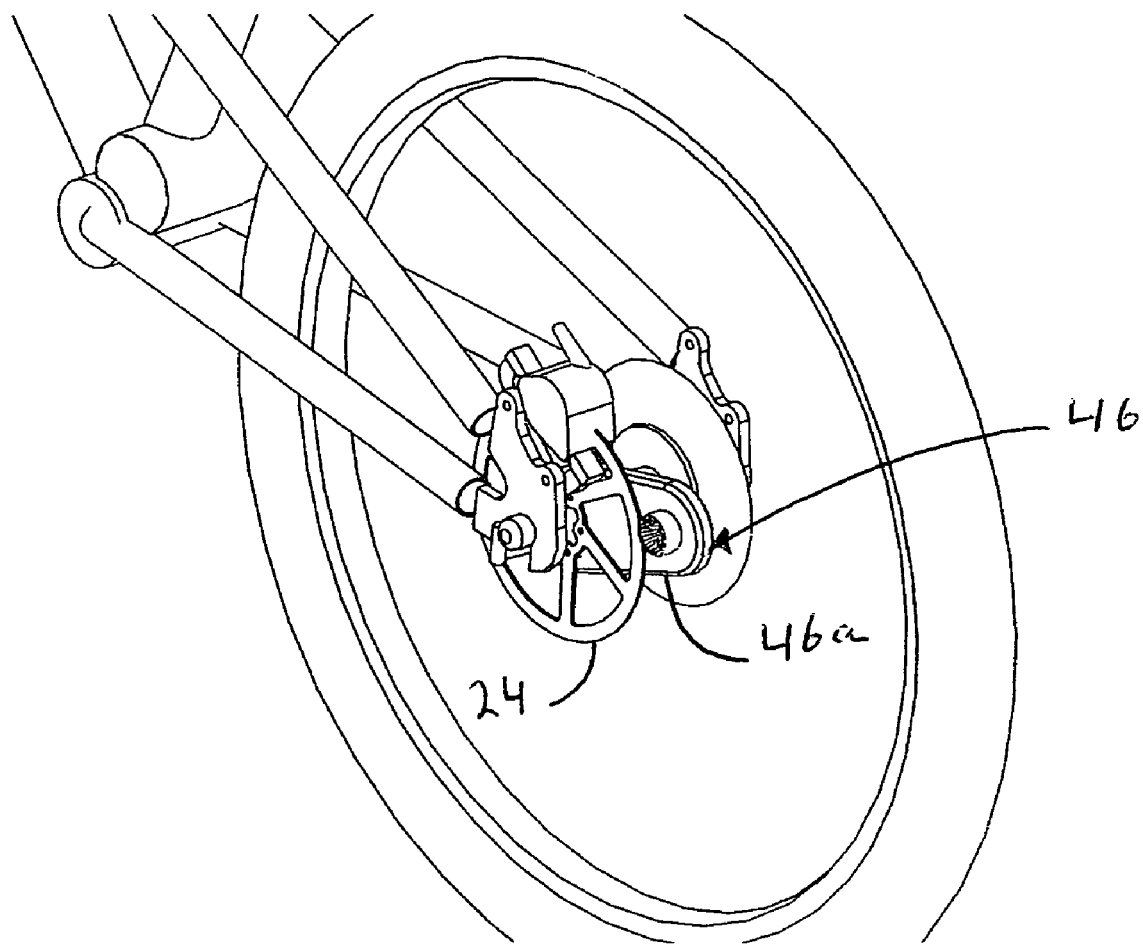
FIG. 12 is a perspective view of the fourth embodiment in which a chain or belt connected final drive on the bicycle couples to the pannier-based gear reduction drive unit.

FIG. 12 is a perspective view of one possible specific configuration of the fourth embodiment in which a chain- or belt-connected final drive 46 couples to the motor drive unit (not shown in this view). Again, a sealed housing 46a protects the final drive mechanism from dust, water, etc.

Figure 13:
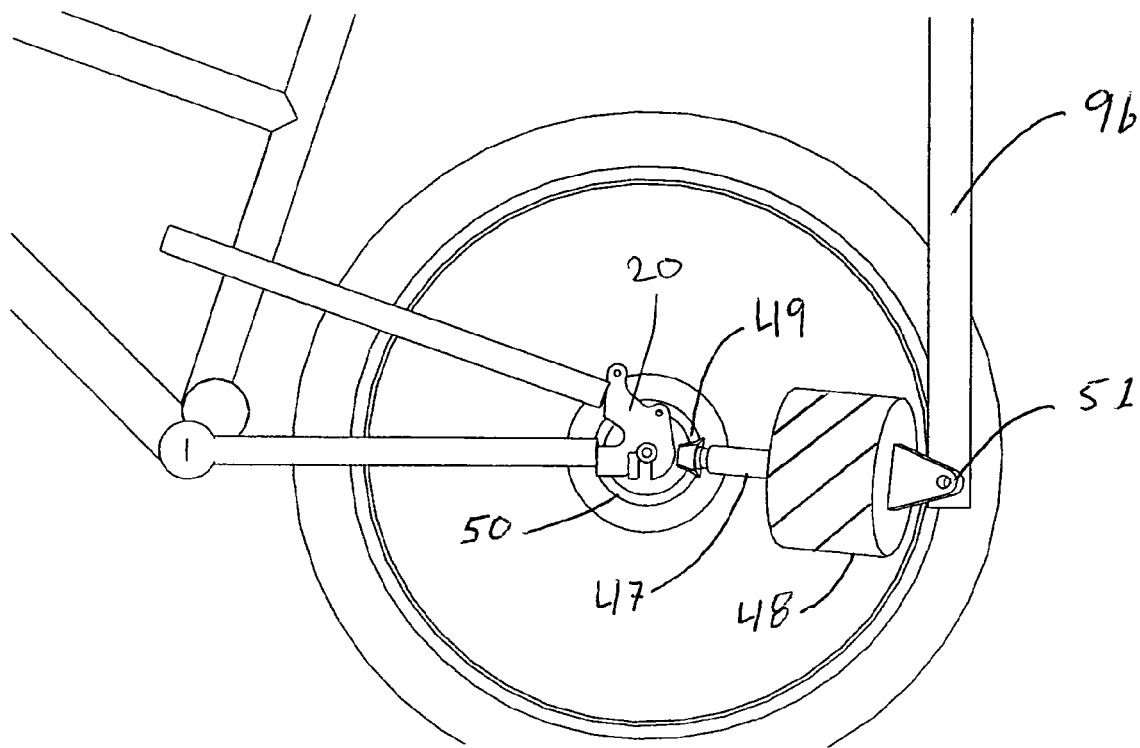
FIG. 13 is a side view of a fifth embodiment of the invention in which a telescopic drive shaft connects the articulating in-pannier motor and a sealed bevel type final drive mechanism of the bicycle, attached to the rear wheel.

FIG. 13 is a side view of one possible configuration of a fifth embodiment of the invention in which a telescopic shaft 47 connects to a motor 48 that articulates within the pannier at a generally horizontal axis 51 at the rear of the motor (the schematic element 96 represents the pannier, fixed relative to the rear rack). This shaft then couples to a quick connect/disconnect hex, spline or similar shape 49 connected to a sealed bevel type final drive mechanism 50 attached to the rear axle of the bicycle, on the inner side of the "drop-out" 20. This sealed final drive 50, which acts as the non-friction wheel drive member, rotates a limited degree around the rear axle to compensate for the shaft 47 orientation during suspension articulation, and is held in the correct position by a spring device (not shown) when the pannier is not attached.

Figure 14:
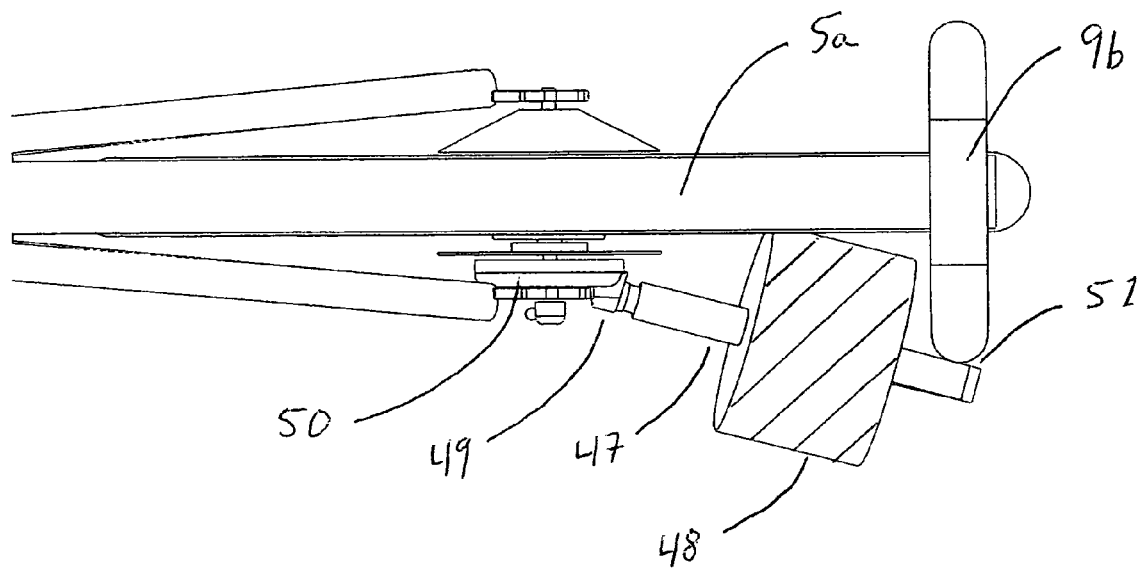
FIG. 14 is a top view of the fifth embodiment showing another view of the components of FIG. 13.

FIG. 14 is a top plan view of this fifth embodiment of the invention seen in FIG. 13. Again, the pivot connection 51 is only represented here. The end of the shaft 47 goes into the quick connect/disconnect hex or spline 49. As indicated, the motor 48 and shaft 47 can be obliquely angled from this top view, as needed.

Figure 15:
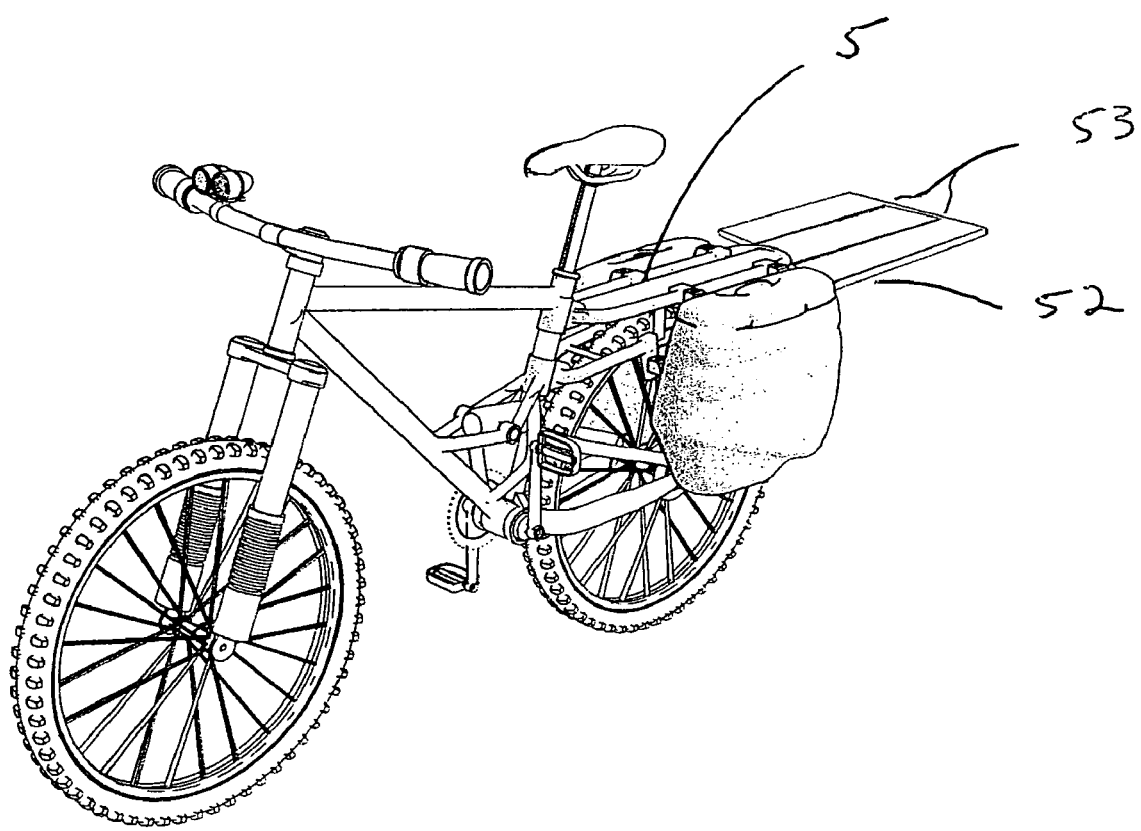
FIG. 15 shows a fold-open solar panel that slides out from the utility rack, included in an embodiment of the invention.

FIG. 15 is a perspective view of a bicycle of the invention with a slide-out, fold-open solar panel 52 that is an accessory to the primary invention. When not used, the "tri-fold" solar panel is folded to one third of its width and slides under the utility rack 5. When the bicycle is parked, the user slides out the folded panel 52 from under the utility rack 5 and unfolds it along "tri-fold" hinge lines 53 to reveal a solar panel with a usable surface of approximately 210 square inches (approximately 10 w of continuous charge in direct sunlight). The rack 5 can include a lower shelf (not shown) and appropriate slide channels for receiving the folded panel.

Although all the above embodiments involve rear wheel drive, the invention also encompasses front wheel drive, as noted above. Rear wheel drive is generally preferred because added weight at the front of a bicycle can be somewhat unwieldy.

Also, although the articulation between the pannier and the wheel, to accommodate the relative motion of rear bicycle suspension, is shown in the above embodiments as included on the pannier side, i.e. an articulated motor drive unit, this can be done otherwise if desired. For example, a simple chain drive unit can be included on the left side of the bicycle's rear hub (not shown), as in the provisional application whose benefit is claimed herein, with the ability to swing up and down in a limited arc; to accommodate the small component of fore/aft movement occasioned by the rear suspension, the motor could be mounted within the pannier so as to slide fore and aft to a slight degree, or this might be accommodated by rubber mounting bushings. In the event the invention includes a bicycle that does not have rear suspension, then articulation movement to accommodate shifting between the pannier and the wheel is not necessary, and a simple sprocket final drive such as in the provisional application could be employed or the wheel axle drive of the first embodiment herein can be used with a motor drive output that is fixed in place, without the need to accommodate movement.

Other drive mechanisms can be used between the pannier and the bicycle wheel, so long as the mechanism involves a quick-disconnect and quick-connect feature and avoids the use of frictional wheel drive. One example is a flexible drive coupling, which could extend from the motor out of the pannier and snap onto, for example, a power coupling element at the wheel axle as in the first embodiment herein.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A bicycle with optional and quickly detachable electric motor power, comprising:
    a bicycle with front and rear wheels, pedals and a chain engaged on sprockets for human powering of the bicycle,
    a wheel of said front and rear wheels having a non-friction wheel drive member connected to drive the wheel and including a power coupling element,
    a modular electric motor with a mounting system for attachment to the bicycle when power is desired, with a motor drive unit connected to the motor and including a rotary drive output of the motor drive unit serving as a power coupling element on the motor drive unit and configured to engage modularly with the power coupling element driving the wheel of the bicycle, the power coupling elements being engaged with a quick connect/disconnect arrangement for quick removal and assembly of the electric motor onto the bicycle without need for tools, and
    a power supply for the electric motor.

2. A bicycle according to claim 1, including a rack on the bicycle mounted above the wheel, and including a pannier containing and encasing the electric motor, with means for quick attachment and detachment of the pannier to the bicycle rack such that, when attached to the bicycle rack, the pannier is positioned such that the power coupling elements of the motor drive unit and of the bicycle become coupled.

3. A bicycle according to claim 2, wherein the rack on the bicycle is suspended by cantilever on the bicycle over the rear wheel without attachment to the bicycle's rear wheel or rear axle, and wherein the bicycle has rear suspension.

4. A bicycle according to claim 3, wherein the power coupling element at the bicycle rear wheel comprises a socket on the axle of the rear wheel adapted to receive the power coupling element of the motor drive unit.

5. A bicycle with optional and quickly detachable electric motor power, comprising:

a bicycle with front and rear wheels, a wheel of said front and rear wheels having a non-friction wheel drive member connected to drive the wheel and including a power coupling element, a modular electric motor with a mounting system for attachment to the bicycle when power is desired, with a motor drive unit connected to the motor and including a rotary drive output of the motor drive unit serving as a power coupling element on the motor drive unit and configured to engage modularly with the power coupling element driving the wheel of the bicycle, the power coupling elements being engaged with a quick connect/disconnect arrangement for quick removal and assembly of the electric motor onto the bicycle, a power supply for the electric motor, including a rack on the bicycle mounted above the wheel, and including a pannier containing and encasing the electric motor, with means for quick attachment and detachment of the pannier to the bicycle rack such that, when attached to the bicycle rack, the pannier is positioned such that the power coupling elements of the motor drive unit and of the bicycle become coupled, and wherein the bicycle has rear suspension allowing a frame segment to which the bicycle seat is attached relative movement with respect to the rear wheel, and wherein the encased electric motor is fixedly mounted with respect to said frame segment, such that the electric motor encounters movement relative to the rear wheel during action of the bicycle's rear suspension, and wherein the motor drive unit includes means for permitting movement of the power coupling element of the motor drive unit relative to the motor, to accommodate and absorb the relative movement caused by action of the rear suspension.

6. A bicycle with optional and quickly detachable electric motor power, comprising:

a bicycle with front and rear wheels, a wheel of said front and rear wheels having a non-friction wheel drive member connected to drive the wheel and including a power coupling element, a modular electric motor with a mounting system for attachment to the bicycle when power is desired, with a motor drive unit connected to the motor and including a rotary drive output of the motor drive unit serving as a power coupling element on the motor drive unit and configured to engage modularly with the power coupling element driving the wheel of the bicycle, the power coupling elements being engaged with a quick connect/disconnect arrangement for quick removal and assembly of the electric motor onto the bicycle, a power supply for the electric motor, and wherein the bicycle has rear suspension allowing a frame segment to which the bicycle seat is attached relative movement with respect to the rear wheel, and wherein the electric motor is fixedly mounted with respect to said frame segment adjacent to the rear wheel, such that the electric motor comprises suspended weight and encounters movement relative to the rear wheel during action of the bicycle's rear suspension, and wherein the motor drive unit includes means for permitting movement of the power coupling element of the motor drive unit relative to the motor, to accommodate and absorb the relative movement caused by action of the rear suspension.

7. A bicycle according to claim 5, further including a second, power supply pannier containing a battery or other energy source with means for rapid attachment to and detachment from the rear rack on an opposite side from said pannier encasing the electric motor, serving as a power supply for the electric motor, and including quick connection means for connecting the energy source to the motor.

8. A bicycle according to claim 6, wherein the power coupling element on the bicycle has a male member with a hex, spline or flat configuration, and wherein the power coupling element of the motor drive unit includes a rotational socket with complementary shape for driving engagement with the male member.

9. A bicycle according to claim 6, wherein the means for permitting movement of the power coupling element comprises a doubly articulated drive unit having two arms with chain drive, a first arm connected to the motor and driving a transfer sprocket at a remote end of said first arm, and a second arm having a chain drive receiving power from the transfer sprocket and driving said power coupling element of the motor drive unit at an end of the second arm.

10. A bicycle according to claim 2, further including a second, power supply pannier containing a battery or other energy source with means for rapid attachment to and detachment from the rack on an opposite side from said pannier encasing the electric motor, serving as a power supply for the electric motor, and including quick connection means for connecting the energy source to the motor.

11. A bicycle according to claim 10, wherein the panniers are aerodynamically shaped.

12. A bicycle with optional and quickly detachable electric motor power, comprising:

a bicycle with front and rear wheels, a wheel of said front and rear wheels having a non-friction wheel drive member connected to drive the wheel and including a power coupling element, a modular electric motor with a mounting system for attachment to the bicycle when power is desired, with a motor drive unit connected to the motor and including a rotary drive output of the motor drive unit serving as a power coupling element on the motor drive unit and configured to engage modularly with the power coupling element driving the wheel of the bicycle, the power coupling elements being engaged with a quick connect/disconnect arrangement for quick removal and assembly of the electric motor onto the bicycle, a power supply for the electric motor, and including modular electrical connections for the electric motor with motor contacts at predetermined positions, and the bicycle including mating electrical contacts at predetermined positions, such that the motor is electrically connected to the power supply directly as a result of the motor being mounted onto the bicycle.

13. A bicycle with optional and quickly detachable electric motor power, comprising:

a bicycle with front and rear wheels, a wheel of said front and rear wheels having a non-friction wheel drive member connected to drive the wheel and including a power coupling element, a modular electric motor with a mounting system for attachment to the bicycle when power is desired, with a motor drive unit connected to the motor and including a rotary drive output of the motor drive unit serving as a power coupling element on the motor drive unit and configured to engage modularly with the power coupling element driving the wheel of the bicycle, the power coupling elements being engaged with a quick connect/disconnect arrangement for quick removal and assembly of the electric motor onto the bicycle, a power supply for the electric motor, and including a rack on the bicycle mounted above the wheel, and including a pannier containing and encasing the electric motor, with means for quick attachment and detachment of the pannier to the bicycle rack such that, when attached to the bicycle rack, the pannier is positioned such that the power coupling elements of the motor drive unit and of the bicycle become coupled, further including a second, power supply pannier containing a battery or other energy source with means for rapid attachment to and detachment from the rack on an opposite side from said pannier encasing the electric motor, serving as a power supply for the electric motor, and including quick connection means f or connecting the energy source to the motor, and wherein the energy source is a battery, and further including a pull-out photovoltaic solar collector panel secured to the rack of the bicycle and connected to the battery, with electrical components for charging the battery via electrical power generated in the solar panel.

14. The bicycle of claim 13, wherein the rack includes a panel storage cavity and wherein the solar panel is foldable into a compact configuration and when folded, fits within the cavity of the rack for protection when riding.

15. A bicycle according to claim 1, further including a photovoltaic solar panel supported on the bicycle to be oriented upwardly and connected to said power supply, which comprises a storage battery.

16. A bicycle according to claim 1, wherein the bicycle includes a final drive mechanism that includes said non-friction wheel drive member and that includes drive reduction, the power coupling element on the bicycle being part of the final drive mechanism.

17. A bicycle according to claim 16, wherein the drive reduction comprises a chain or belt drive.

18. A bicycle according to claim 2, wherein the pannier encasing the electric motor is larger in volume than the electric motor and provides storage capacity in an upper portion of the pannier above the motor.

19. A bicycle with optional and quickly detachable electric motor power, comprising:

a bicycle with front and rear wheels, a wheel of said front and rear wheels having a non-friction wheel drive member connected to drive the wheel and including a power coupling element, a modular electric motor with a mounting system for attachment to the bicycle when power is desired, with a motor drive unit connected to the motor and including a rotary drive output of the motor drive unit serving as a power coupling element on the motor drive unit and configured to engage modularly with the power coupling element driving the wheel of the bicycle, the power coupling elements being engaged with a quick connect/disconnect arrangement for quick removal and assembly of the electric motor onto the bicycle, a power supply for the electric motor, including a rack on the bicycle mounted above the wheel, and including a pannier containing and encasing the electric motor, with means for quick attachment and detachment of the pannier to the bicycle rack such that, when attached to the bicycle rack, the pannier is positioned such that the power coupling elements of the motor drive unit and of the bicycle become coupled, wherein the pannier encasing the electric motor is larger in volume than the electric motor and provides storage capacity in an upper portion of the pannier above the motor, and wherein the storage capacity of the pannier encasing the electric motor comprises at least about one-half the volume of the pannier.

20. A bicycle with optional and quickly detachable electric motor power, comprising:

a bicycle with front and rear wheels, a wheel of said front and rear wheels having a non-friction wheel drive member connected to drive the wheel and including a power coupling element, a modular electric motor with a mounting system for attachment to the bicycle when power is desired, with a motor drive unit connected to the motor and including a rotary drive output of the motor drive unit serving as a power coupling element on the motor drive unit and configured to engage modularly with the power coupling element driving the wheel of the bicycle, the power coupling elements being engaged with a quick connect/disconnect arrangement for quick removal and assembly of the electric motor onto the bicycle, a power supply for the electric motor, including a rack on the bicycle mounted above the wheel, and including a pannier containing and encasing the electric motor, with means for quick attachment and detachment of the pannier to the bicycle rack such that, when attached to the bicycle rack, the pannier is positioned such that the power coupling elements of the motor drive unit and of the bicycle become coupled, further including a second, power supply pannier containing a battery or other energy source with means for rapid attachment to and detachment from the rack on an opposite side from said pannier encasing the electric motor, serving as a power supply for the electric motor, and including quick connection means for connecting the energy source to the motor, and wherein the power supply pannier is larger in volume than the battery or other energy source and provides storage capacity in an upper portion of the pannier above the energy source.

21. A bicycle according to claim 20, wherein the storage capacity of the power supply pannier comprises at least about one-half the volume of the pannier.

22. A bicycle according to claim 10, wherein the power supply is a modular component of the power supply pannier and can be interchanged with batteries or other energy sources of different sizes and energy capacities.

23. A bicycle according to claim 1, wherein the power coupling element on the bicycle comprises a ring gear connected to a rim of the rear wheel, serving also as said non-friction wheel drive member, and wherein the power coupling element of the motor drive unit comprises a small gear and extends to a position to engage the ring gear on the bicycle wheel.

24. A bicycle according to claim 23, further including means for retaining the small gear of the motor drive unit in engagement with the ring gear.

25. A bicycle according to claim 23, wherein the bicycle has rear suspension allowing a frame segment to which the bicycle seat is attached relative movement with respect to the rear wheel, and wherein the electric motor is fixedly mounted with respect to said frame segment adjacent to the rear wheel, such that the electric motor encounters movement relative to the rear wheel during action of the bicycle's rear suspension, and wherein the motor drive unit includes means for permitting movement of the power coupling element of the motor drive unit relative to the motor, to accommodate and absorb the relative movement caused by action of the rear suspension.

26. A bicycle according to claim 25, wherein the means for permitting movement of the power coupling element comprises a doubly articulated drive unit having two arms with chain drive, a first arm connected to the motor and driving a transfer sprocket at a remote end of said first arm, and a second arm having a chain drive receiving power from the transfer sprocket and driving said small gear of the power coupling element of the motor drive unit at an end of the second arm.

27. A bicycle according to claim 2, wherein the bicycle has rear suspension and the pannier is adjacent to the rear wheel, and wherein the motor drive unit is pivotally connected in the pannier about a generally horizontal axis, the motor having a rotary outward shaft extending toward the hub of the bicycle's rear wheel, and wherein the bicycle includes a final drive mechanism at the rear wheel that includes said non-friction wheel drive member comprising a bevel drive unit, connected to the wheel axle, the power coupling element of the bicycle comprising a connection to the bevel drive unit and the power coupling element of the motor drive unit comprising a connector which engages with said connection to the bevel drive unit in a quick-disconnect arrangement, whereby the motor can swing up and down generally about the axle of the rear wheel of the bicycle to accommodate and absorb relative movement of the pannier and the wheel caused by action of the rear suspension.

28. A bicycle according to claim 27, wherein the rotary output shaft includes a telescoping spline, whereby the motor can move in/out relative to the rear wheel axle.

29. A bicycle with optional and quickly detachable electric motor power, comprising:
a bicycle with front and rear wheels,
a wheel of said front and rear wheels having a non-friction wheel drive member connected to drive the wheel and including a power coupling element,
a modular electric motor with a mounting system for attachment to the bicycle when power is desired, with a motor drive unit connected to the motor and including a rotary drive output of the motor drive unit serving as a power coupling element on the motor drive unit and configured to engage modularly with the power coupling element driving the wheel of the bicycle, the power coupling elements being engaged with a quick connect/disconnect arrangement for quick removal and assembly of the electric motor onto the bicycle,
a power supply for the electric motor, and
wherein the motor and motor drive unit are positioned on the bicycle such that a center of gravity of the motor and motor drive unit is below the wheel rim at the top of the wheel.

30. A bicycle according to claim 29, wherein the center of gravity is approximately at the center of a distance from the wheel axle up to the rim.

31. A bicycle according to claim 29, wherein the center of gravity is approximately five to seven inches below the wheel rim at the top of the wheel.

32. A bicycle according to claim 29, wherein the center of gravity is at least two inches below the wheel rim at the top of the wheel.

33. A bicycle with panniers, comprising a rear rack secured to the bicycle and mounted over the rear wheel of the bicycle and a pair of separate and independent panniers, one on each side of the rear wheel and each being firmly secured to the rack, the panniers respectively encasing a power source and an electric motor connected to drive the bicycle with quick-disconnect drive means.

34. A bicycle according to claim 33, wherein the panniers are aerodynamically shaped.

35. A bicycle according to claim 33, wherein the panniers and the rear rack include quick-release snap-in connection means for securing the panniers to the rack to enable quick attachment of the panniers when power is desired and also quick removal of the panniers.

36. A bicycle according to claim 35, wherein the quick-release snap-in connection means includes electrical connections between the two panniers to power the motor by the power source.

37. A bicycle powered by an electric motor, comprising:
a bicycle with front and rear wheels, one of the wheels in driving engagement with an electric motor,
a rechargeable battery retained on the bicycle and connected to the electric motor,
a rear rack secured to the bicycle, and
a pull-out photovoltaic solar collector panel secured to the rack of the bicycle and connected to the battery, with electrical components for charging the battery via electrical power generated in the solar panel.

38. A bicycle according to claim 37, wherein the rack includes a panel storage cavity and wherein the solar panel is foldable into a compact configuration and when folded, fits within the cavity of the rack for protection when riding.

39. A bicycle according to claim 1, wherein the non-friction wheel drive member includes a connection of the bicycle's power coupling element with a hub of the rear wheel such that the bicycle's power coupling element is axially aligned with the rear wheel's axis of rotation.

40. A bicycle with optional and quickly detachable electric motor power, comprising:
a bicycle with front and rear wheels,
a wheel of said front and rear wheels having a non-friction wheel drive member connected to drive the wheel and including a power coupling element,
a modular electric motor with a mounting system for attachment to the bicycle when power is desired, with a motor drive unit connected to the motor and including a rotary drive output of the motor drive unit serving as a power coupling element on the motor drive unit and configured to engage modularly with the power coupling element driving the wheel of the bicycle, the power coupling elements being engaged with a quick connect/disconnect arrangement for quick removal and assembly of the electric motor onto the bicycle,
a power supply for the electric motor, and
wherein the non-friction wheel drive member includes a connection of the bicycle's power coupling element with a hub of the rear wheel such that the bicycle's power coupling element is axially aligned with the rear wheel's axis of rotation, and wherein the bicycle's power coupling element is connected as an axial extension of the rear wheel hub and extends through a drop out of a frame of the bicycle.

41. A bicycle according to claim 40, wherein the bicycle's power coupling element comprises a spline for quick sliding connection and disconnection of the motor's power coupling element.

* * * * *